Nov. 15, 1960 A. DAUGUET 2,960,001
INFRA-RED OPTICAL SWEEP SYSTEM
Filed April 11, 1958 3 Sheets-Sheet 1

INVENTOR.
ALEXANDRE DAUGUET
BY
AGENT.

Nov. 15, 1960 A. DAUGUET 2,960,001
INFRA-RED OPTICAL SWEEP SYSTEM
Filed April 11, 1958 3 Sheets-Sheet 2

INVENTOR.
ALEXANDRE DAUGUET
BY
AGENT.

Nov. 15, 1960

A. DAUGUET 2,960,001

INFRA-RED OPTICAL SWEEP SYSTEM

Filed April 11, 1958

INVENTOR.
ALEXANDRE DAUGUET.
BY
AGENT.

United States Patent Office 2,960,001
Patented Nov. 15, 1960

2,960,001
INFRA-RED OPTICAL SWEEP SYSTEM

Alexandre Dauguet, Paris, France, assignor to Laboratoires d'Electronique et de Physique Appliquees L.E.P., Paris, France Filed Apr. 11, 1958, Ser. No. 727,906

Claims priority, application France Oct. 18, 1957

9 Claims. (Cl. 88—1)

The present invention relates to an optico-mechanical sweeping device intended to apply in given order to a sensitive member of selected spectral characteristic, the brightness information relative to different portions of the region swept.

More particularly, the instant invention relates to optico-mechanical sweeping devices operating on Cartesian coordinates, of a type having in combination a window transparent to the radiation in question, a member consisting of pivoting plano-parallel mirrors to which are imparted a sawtooth motion, a parabolic mirror supplying a real image of the region the radiation of which is caught through the window by pivoting mirrors, and a turning wheel bearing reflecting surfaces which are suitably oriented to project successively onto the element which is sensitive to the radiation in question the brightness information of the surface elements of the said real image.

Devices of this type are used in particular in connection with a device which processes the information supplied to the sensitive element in order to supply a "view" of the region swept.

The object of the invention is in particular to make such optico-mechanical sweeping devices such that they satisfy better than heretofore the various requirements of actual practice and in particular make it possible to obtain devices having a large entrance pupil, greater brightness and small space requirements.

The invention consists primarily, in the case of an optico-mechanical sweeping device of the type in question, in arranging the axes of rotation of the said pivoting parallel mirrors in a plane making an angle close to 45° with the axis of the said parabolic mirror, the plane of the said turning wheel being parallel and as close as possible to the plane of the axes of rotation of the said pivoting mirrors. The axis of rotation of the said turning wheel passes near the sensitive element, and that furthermore in this arrangement, the said reflecting surfaces of the turning wheel consist of concave mirrors, the fluxes reflected by the said concave mirrors reaching said sensitive element only when said mirrors occupy positions close to the axis of the parabolic mirror.

More particularly, the invention relates to an optical scanning system for analyzing an image, particularly an infra-red image. Thus, the image is first scanned by a plurality of plane reflectors which pivot about a set of axes lying in a plane in order to dissect the image into a series of lines as is done by a television camera tube. Next, each of these strips is reflected by a parabolic reflector arranged to reflect those strips successively onto a second group of reflectors arranged to rotate and thereby scan each strip and dissect it into a plurality of segments each of which is an elemental area of the image, corresponding to dot-scanning of a line in a television camera tube. A radiation-responsive device detects the radiation reflected by each of the latter group of reflectors. In effect, the device functions in a manner analogous to a television camera tube except that it is adapted particularly for scanning an infra-red image which a television camera tube is not.

The invention also contemplates different arrangements which can be noted from the following descriptions, in particular the following:

(1) In a device according to the invention, the focal image portion scanned by each mirror is limited in longitudinal direction by providing in the extension of the analyzed image portion and on both sides of the plane of symmetry of the sweeping unit, two opaque diaphragm elements of a transverse dimension approximately equal to that of the image portion scanned by each mirror.

(2) In a device of the type in question, the sensitive element of which is sensitive to infrared radiation, the two diaphragm elements have flat reflecting surfaces perpendicular to the plane of symmetry of the sweeping device and inclined 90° to the plane of the axes of the pivoting flat mirrors so as to send to the concave scanner mirrors at the beginning and at the end of the scanning of a line a part of the flux passing through the entrance window (hole) of the device.

(3) The invention relates to certain embodiments and methods of application (in particular apparatus making it possible to detect and locate in a region objects which emit infrared radiation) and, as novel industrial products, optico-mechanical sweep devices entailing the application of the above arrangements, the special elements and tools entering into their creation, as well as units, both stationary and movable, having such devices.

The above and other features, objects and advantages of the present invention will be fully understood from the following description considered in connection with the accompanying illustrative drawings.

Figure 1:
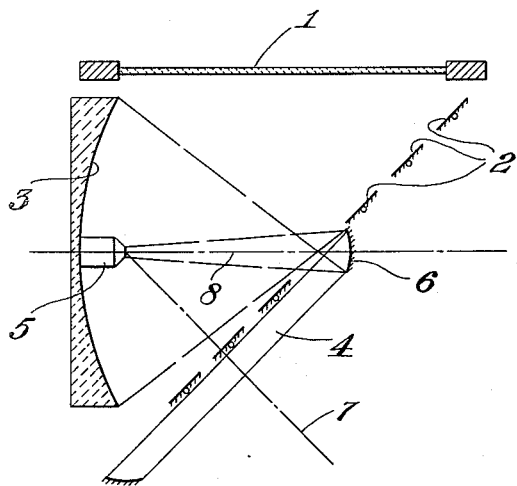
Fig. 1 is a horizontal cross-section through the sweep device.
Figure 1A:
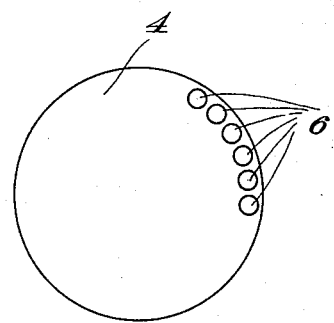
Fig. 1a is a plan view of the mirror disc for dissecting the image.

Referring more particularly to Fig. 1, there is shown a horizontal cross-section of the optico-mechanical sweep device through the plane of symmetry of the device. In this figure, reference numeral 1 is the entrance window of the apparatus, and reference numeral 2 is an assembly of plane rectangular mirrors parallel to each other and pivoting around vertical axes in a "sawtooth" pattern. The pivot axes of the unit 2 are located in a vertical plane inclined 45° with respect to the hole 1. The unit 2 effects the horizontal sweeping of a large portion of the space located in front of the hole 1. The rays reflected by the unit 2 are intercepted by a parabolic mirror 3, the axis of which is parallel to the hole 1 and forms an angle of 45° with the plane of the axes of the unit 2. The parabolic mirror 3 produces a real image in its focal plane; an aperture provided in the unit 2 permits the formation of said image behind the plane of the axes of the unit 2. The focal image is scanned cyclically in vertical direction by a disc 4 bearing mirrors 6 suitably oriented to reflect onto a sensitive element 5 the information gathered by each mirror during the sweeping of the scanned curve. In the arrangement proposed, the sweeping curves are approximately segments of vertical lines.

The arrangement in accordance with the invention has numerous features which make it possible, in particular, to obtain a sweeping device having a large entrance pupil which affords great brightness and small space. The disc 4 is located behind the unit 2; it is as close to this unit as permitted by the motion of the plane scanning mirrors. This affords the possibility of reducing the aperture provided in the unit 2 so as to permit the passage of the flux coming from the scanning mirrors of the wheel 4. This arrangement avoids the loss of primary flux. The disc 4 bears scanning mirrors which are concave mirrors operating under optical conditions close to optimum conditions and corresponding to the Gauss approximation. Theoretically, scanning concave mirrors should, in order to operate under the best conditions, move, at least during the scanning period, over a cylindrical surface enclosing an axis 8 passing through the sensitive element 5. In the arrangement in accordance with the invention, the disc 4 has its axis of rotation 7 which passes through the sensitive element 5. During the scanning period, each mirror envelops a surface tangent and very close to the theoretical surface corresponding to Gauss' approximation.

The use of concave scanning mirrors greatly facilitates furthermore the production of a vertical field-limiting diaphragm in the focal plane of the mirror 3, this diaphragm constitutes a very important feature of the invention. The purpose of the diaphragm is to obtain the limitation of the interval during which each concave mirror operates so as to avoid the formation of a multiple image.

Figure 2:
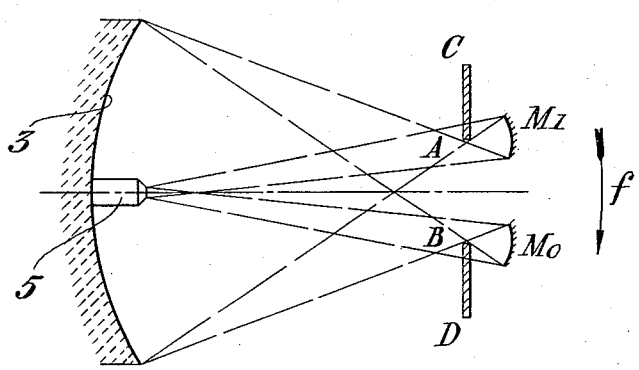
Fig. 2 is a vertical cross-section through the sweep device.
Figure 2A:
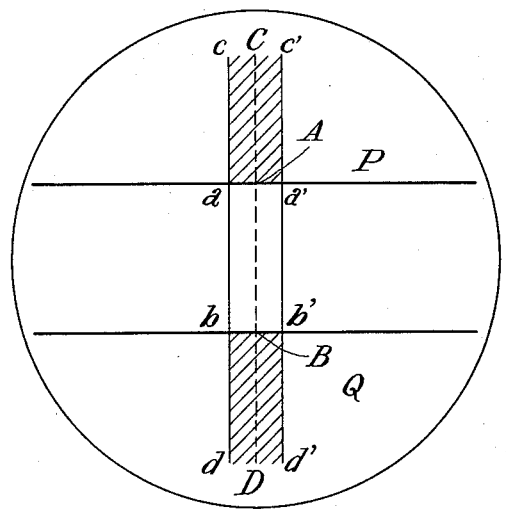
Fig. 2a is a view of the focal plane of the parabolic mirror.
Figure 3:
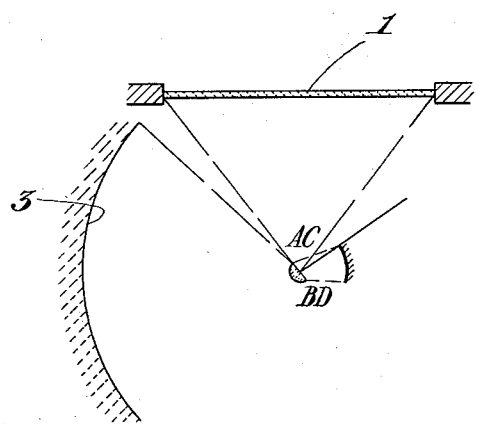
Fig. 3 is a simplified horizontal cross-section showing a special arrangement of the diaphragm of the device.

In Fig. 2 there is shown a diagram of a vertical cross-section of the optico-mechanical sweeping device along a plane containing the optical axis of the mirror 3; this diagram is intended to show the operation of the field limiting diaphragm. In this figure, the same letters designate the same parts as in Fig. 1. AC and BD represent the traces of the focal plane. AB designates the trace of the "line" scanned by a concave scanning mirror. $M_0$ and $M_1$ designate two successive scanning mirrors, $f$ indicating the direction of rotation of the disc 4. $M_1$ is shown at the moment when the scanning of line AB commences, that is to say at the moment when $M_0$ has finished the scanning of the previous line. At the moment which precedes the commencing of the scanning of AB, the mirror $M_1$ must not send luminous flux onto the sensitive element 5; in order to obtain this result, an opaque half-plane, limited at the bottom by the horizontal of trace A, can be placed in the focal plane of the mirror 3. This solution is shown in Fig. 2a which gives a view of the focal plane of the mirror 3. In the foregoing there has been designated by the word line the portion of the focal image scanned by a concave scanning mirror; this line is not a geometric segment but a surface element $cc'$, $dd'$. The solution proposed above to cause the scanning of a concave mirror to begin at A consists in placing a half-plane, designated by P, in the focal plane. Likewise, in order to cause the scanning to terminate at B, a half-plane designated by Q is placed in the focal plane. This solution has the drawback of losing at the beginning and at the end of the scanning of the line AB a substantial portion of the brightness flux participating in the formation of the image $aa'$ $bb'$. In an improved solution, the half-planes P and Q are replaced by small elongated opaque rectangles $aa'$, $cc'$, and $bb'$, $dd'$ placed in the focal plane, symmetrical with respect to the plane of symmetry of the optical system. The width of these rectangles corresponds to the width of the line scanned. In the event that the element 5 is sensitive to light rays, the results obtained with this type of diaphragm are satisfactory; on the other hand, in the case of infrared, special precautions must be taken. The infrared flow emitted through the diaphragm AC BD which is at the temperature of the apparatus, for instance 25° C., causes an important disturbance in the examination, at night, of a landscape the average temperature of radiation of which is of the order of 10° C. In order to overcome this drawback, it is proposed, and constitutes an important characteristic of the present invention, to make the diaphragm AC BD of elements having plane reflecting surfaces arranged so as to reflect a part of the beam which enters the apparatus through the entrance opening, against the concave scanning mirrors. By this arrangement, the radiation proper of the field-limiting diaphragm is replaced by a radiation corresponding to the average temperature of the landscape scanned. In Fig. 3, there is shown a simplified horizontal cross-section of the optico-mechanical system showing the arrangement of the reflecting elements of elements AC BC with the path of the corresponding light rays.

In one special embodiment intended for the infrared scanning of a landscape, the optico-mechanical device is supported in a rigid frame of cast duralumin. In this arrangement, the opening 1 is of rectangular shape. It consists of four silica panes of 15 x 19 cm. The assembly 2 consists of nine vertical movable flaps bearing plane mirrors, and a system of connecting rods imparts to these flaps a sawtooth movement of a frequency of 2 c.p.s. The parabolic mirror 3 has a diameter of 30 cm. and a focal length of 30 cm., while the disc 4 of truncated conical shape bears on its edge concave spherical mirrors of 3.4 cm. focal length. To this disc is imparted a rotation at a speed of 9 r.p.m. The interchangeable cell 5 is a lead sulfide photo-resistant cell in which the sensitive surface of which is 4 x 11 mm. It is placed in a chrome-plated-brass support, having a channel and a piston, making it possible to use carbon dioxide rods for its cooling, as described in the applicant's French Patent No. PV 718,166 of July 6, 1956, entitled "Device for the Production of Solidified Bars of Carbon Dioxide or Similar Substances."

By means of a gear system (not shown) secured to the rear of the frame, the unit 2 and the disc 4 are driven by a common motor.

Figure 4:
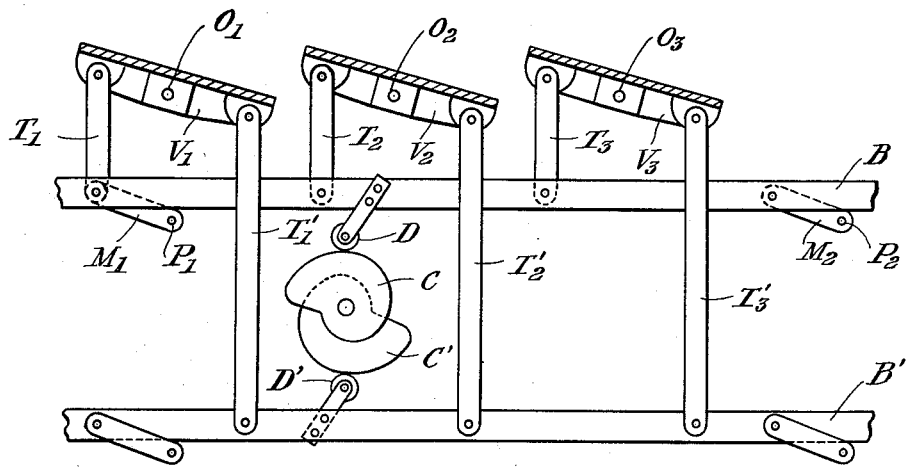
Fig. 4 is a view of the mechanical driving device for the plane mirrors.

In Fig. 4 there is shown the mechanical device intended to produce the sawtooth movement of the plane mirrors. In this figure there is shown a view of the lower portion of three flaps or supports $V_1$, $V_2$, $V_3$, bearing plane mirrors; these flaps pivot around vertical axes $O_1$, $O_2$, $O_3$. $T_1$, $T_2$ and $T_3$ are rods which can pivot around their ends and connect the flaps $V_1$, $V_2$, $V_3$ respectively to a connecting rod B. The displacements of this connecting rod are controlled by cranks $M_1$ and $M_2$ movable parallel to each other while they move. In the same way the rods $T'_1$, $T'_2$, $T'_3$, the connecting rod B' and the cranks $P_1'$ and $P_2'$ fulfill similar functions. The inclination of the flaps V and thus that of the mirrors is determined by the distance between the connecting rods B and B'. Cams C and C' fastened to the same shaft cooperate with rollers D and D' respectively which are rigidly fastened to the connecting rods B and B'.

A spring system (not shown) urges the rollers against their respective cams. The movement of the flap unit is controlled by the rotation of the cam shaft which itself is driven by a shaft of the aforementioned gear system. The profile of the cams is constructed so as to assure the sawtooth movement corresponding to the horizontal scanning. The device intended to assure the initiation of the horizontal sweeping advantageously consists of a contact which is controlled at a given moment upon each rotation of the cam shaft. Furthermore, the initiation of the vertical sweeping may consist of a contact controlled by the drive shaft of the vertical scanning wheel.

Figure 5:
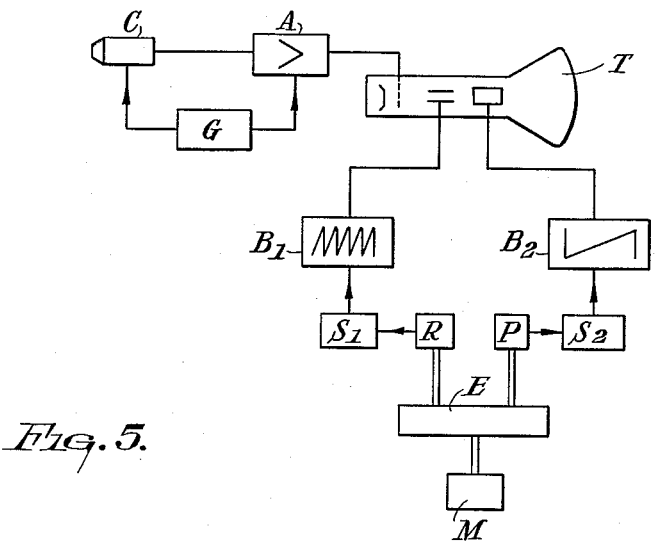
Fig. 5 is a diagrammatic illustration of the device for the processing of the information received by the sensitive element.

In Fig. 5 there is shown the general diagram of a unit intended to process information obtained by the sensitive element in order to supply, on the screen of an oscilloscope, a panoramic representation, for instance in infrared, of the field observed by the apparatus. In this figure C is the sensitive element, A an amplifier, G a stabilized voltage generator, T a cathode ray tube, $B_1$ an electronic sweep generator, $B_2$ an electronic horizontal sweep generator, $S_1$ and $S_2$ are the collector devices permitting the generators $B_1$ and $B_2$ to start in synchronism with the mechanical sweepings effect by the optico-mechanical system, R is the vertical scanning wheel, p is the assembly of pivoting mirrors, E is a gearing and M is the drive motor of the optico-mechanical device.

The information collected by C is amplified by A and applied at a suitable level to the grid of the tube T. The sweep generators $B_1$ and $B_2$ are connected to the vertical and horizontal deflecting plates of the tube T. The tube T has all the auxiliary circuits customarily associated with measurement oscilloscopes and in particular a brightness and focus control circuit, as well as centering circuits. All the above mentioned electronic devices are conventional types, without any special feature inherent in the invention. It has however been found that a two-stage amplifier A is particularly suitable. In the embodiment, the preamplifier stage is eliminated in order to avoid microphonics. The device is equipped with a subminiature pentode and the load resistances are of a very low noise type; the output stage consists of two pentodes provided with filter circuits permitting partial compensation of the transfer function of the cell. The supply G is stabilized by a neon bulb and it permits a precise biasing of the screens of the amplifier tubes. The sweep circuits employ the linear charging of capacitors by a high voltage of 2000 volts, this charging is assured by two twin triode tubes, the grids of which are controlled by the vertical and horizontal sweep contacts. The horizontal sweep furthermore comprises a linearity correction device. The cathode tube used is preferably a tube of 18 cm. in diameter with a screen having a certain remanence.

By means of the device described, it is in particular possible to detect at night and locate hot bodies present in the portion of the space scanned. This device makes it possible for instance to note the presence of a vehicle, the radiator of which is at a temperature higher than the surrounding temperature or else the presence of a man.

The invention of course is not limited to infrared optico-mechanical scanning devices; it applies to devices which are sensitive to other radiation ranges.

The present invention results in an optico-mechanical sweep device operating on basis of Cartesian coordinates and having in combination a window which is transparent to the radiation in question, a member consisting of pivoting plane-parallel mirrors imparted a sawtooth movement; a parabolic mirror supplying a real image of the region the radiation of which is collected through the window by the pivoting mirrors; a rotating disc bearing reflecting surfaces suitably oriented to project successively onto an element sensitive to the radiation in question the brightness information of the surface elements of the said real image. The invention moreover, consists primarily in arranging the axes of rotation of the said pivoting mirrors in a plane forming an angle close to 45° with the axis of the said parabolic mirror, the plane of the said rotating wheel being parallel and as close as possible to the plane of the axis of rotation of the said pivoting mirrors, the axis of rotation of the rotating wheel passing near the said sensitive element; and furthermore, in said arrangement the said reflecting surfaces consist of concave mirrors, the fluxes reflected by the said concave mirrors reaching the said sensitive element only when said mirrors occupy positions close to the axis of the parabolic mirror.

In accordance with the invention the following may be furthermore employed individually or in combination:

(a) The focal image position scanned by each mirror is limited in longitudinal direction by providing, in the extension of the image portion scanned, and on both sides of the plane of symmetry of the sweep unit, two opaque diaphragm elements of a transverse dimension approximately equal to that of the image portion scanned by each mirror.

(b) In a device according to the invention, the sensitive element of which is sensitive to infrared radiation, the two diaphragm elements have reflecting plane surfaces perpendicular to the plane of symmetry of the sweep device, and inclined at 90° to the plane of the axes of the pivoting mirrors so as, at the beginning and at the end of the scanning of a line, to send a part of the flux traversing the entrance window.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. An optical scanning system comprising, in combination, a plurality of plane reflectors positioned parallel to one another to receive and reflect radiant energy from an image plane, means to pivot said plane reflectors about axes lying in a given plane forming a given angle with the image plane in a sawtooth pattern to thereby scan successive portions of the image plane, focussing reflector means disposed to intercept radiant energy reflected by said plane reflectors and to focus the radiant energy into a real image at the focal plane thereof located beyond the plane of said axes, said focussing reflector means having an axis forming a given angle with said given plane, a second plurality of reflectors positioned to intercept the focussed radiant energy and reflect the same along the axis of said focussing reflector means, means to rotate said latter reflectors about an axis perpendicular to the axis of said focussing reflector means for scanning and reflecting successive segments of the image portions reflected by the plane reflectors, and radiant energy detection means positioned to intercept the radiation reflected by said latter reflectors.

2. An optical scanning system comprising, in combination, a plurality of plane reflectors positioned parallel to one another to receive and reflect radiant energy from an image plane, means to pivot said plane reflectors about axes lying in a given plane forming a given angle with the image plane in a sawtooth pattern to thereby scan successive portions of the image plane, a parabolic reflector disposed to intercept radiant energy reflected by said plane reflectors and to focus the radiant energy into a real image at the focal plane thereof located beyond the plane of said axes, said parabolic reflector having an axis forming a given angle with said given plane, said plane reflectors being further positioned to define an aperture through which radiant energy focussed by the parabolic detector passes and forms the real image at the focal plane, a second plurality of reflectors positioned to intercept the radiant energy focussed by the parabolic reflector and reflect the same along the axis of the parabolic reflector, means to rotate said latter reflectors about an axis perpendicular to the axis of said parabolic reflector for scanning and reflecting successive segments of the image portions reflected by a plane reflector, and radiant energy detection means positioned to intercept the radiation reflected by said latter reflectors.

3. An optical scanning system comprising, in combination, a plurality of plane reflectors positioned parallel to one another to receive and reflect radiant energy from an image plane, means to pivot said plane reflectors about axes lying in a given plane forming a given angle with the image plane in a sawtooth pattern to thereby scan successive portions of the image plane, a parabolic reflector disposed to intercept radiant energy reflected by said plane reflectors and to focus the radiant energy into a real image at the focal plane thereof located beyond the plane of said axes, said parabolic reflector having an axis forming a given angle with said given plane, said plane reflectors being further positioned to define an aperture through which radiant energy focussed by the parabolic detector passes and forms the real image at the focal plane, a plurality of concave reflectors positioned to intercept the radiant energy focussed by the parabolic reflector and reflect the same along the axis of the parabolic reflector, means to rotate said concave reflectors about an axis perpendicular to the axis of said parabolic reflector for scanning and reflecting successive segments of the image portions reflected by the plane reflectors, and radiant energy detection means positioned to intercept the radiation reflected by said concave reflectors.

4. An optical scanning system comprising, in comprising, in combination, a plurality of plane reflectors positioned parallel to one another to receive and reflect radiant energy from an image plane, means to pivot said plane reflectors about axes lying in a given plane forming an angle of about 45° with the image plane in a sawtooth pattern to thereby scan successive portions of an image, a parabolic reflector disposed to intercept radiant energy reflected by said plane reflectors and to focus the radiant energy into a real image at the focal plane thereof located beyond the plane of said axes, said parabolic reflector having an axis forming a given angle with said given plane, said plane reflectors being further positioned to define an aperture through which the radiant energy focussed by the parabolic reflector passes and forms the real image at the focal plane, a plurality of concave reflectors positioned on the periphery of a wheel and located to intercept the concave radiant energy focussed by the parabolic reflector and reflect the same along the axis thereof, means to rotate said wheel about an axis perpendicular to the axis of said parabolic reflector synchronously with the sweep of the plane reflectors whereby each image portion reflected by said plane reflectors is scanned and a plurality of segments reflected by said concave reflectors, and radiant energy detection means positioned to intercept the radiation reflected by said concave reflectors.

5. An optical scanning system comprising, in combination, a plurality of plane reflectors positioned parallel to one another to receive and reflect radiant energy from an image plane, means to pivot said plane reflectors about axes lying in a given plane forming an angle of about 45° with the image plane in a sawtooth pattern to thereby scan successive portions of an image, a parabolic reflector disposed to intercept radiant energy reflected by said plane reflectors and to focus the radiant energy into a real image at the focal plane thereof located beyond the plane of said axes, said parabolic reflector having an axis forming a given angle with said given plane, said plane reflectors being further positioned to define an aperture through which radiant energy focussed by the parabolic reflector passes and forms the real image at the focal plane, a second plurality of concave reflectors positioned on the periphery of a wheel and located to intercept the radiant energy focused by the parabolic reflector and reflect the same along the axis thereof, means to rotate said wheel about an axis perpendicular to the axis of said parabolic reflector synchronously with the sweep of the palne reflectors whereby each image portion reflected by said plane reflectors is scanned and a plurality of segments reflected by said concave reflectors, diaphragm means to limit the radiation reflected by said concave reflectors to only that reflected by one of said concave reflectors, and radiant energy detection means positioned to intercept the radiation reflected by said concave reflectors.

6. An optical scanning system as claimed in claim 5 in which the diaphragm means comprises a pair of rectangular opaque plates arranged symmetrically on opposite sides of the axis of the parabolic perpendicular to the planes of the plane reflectors.

7. An optical scanning system as claimed in claim 6 in which the radiant energy detecting means is positioned on the axis of the parabolic reflector.

8. An optical scanning system as claimed in claim 7 in which the radiant energy detection means is a lead-sulfide element.

9. An optical scanning system as claimed in claim 1 in which the means for pivoting the plane reflectors comprises a cam, roller means urged against the cam, and linkage means coupling the roller to the plane reflectors for pivoting the same.

References Cited in the file of this patent

UNITED STATES PATENTS

| | | |
|---|---|---|
| 2,410,550 | Padva | Nov. 5, 1946 |
| 2,515,762 | Dimmick | July 18, 1950 |
| 2,844,033 | Tandler et al. | July 22, 1958 |
| 2,769,374 | Sick | Nov. 6, 1956 |

UNITED STATES PATENT OFFICE
CERTIFICATION OF CORRECTION

Patent No. 2,960,001                      November 15, 1960

Alexandre Dauguet

It is hereby certified that error appears in the above numbered patent requiring correction and that the said Letters Patent should read as corrected below.

Column 2, line 13, for "of the type in question" read -- according to the invention --; column 7, lines 15 and 16, strike out "in comprising,".

Signed and sealed this 30th day of May 1961.

(SEAL)
Attest:

ERNEST W. SWIDER
Attesting Officer

DAVID L. LADD
Commissioner of Patents